J. W. THOM.
PLOW.

No. 191,267.  Patented May 29, 1877.

Witnesses:
A. B. Murch
Wm. Wells.

Inventor:
John W. Thom

UNITED STATES PATENT OFFICE.

JOHN W. THOM, OF MINNEAPOLIS, KANSAS.

IMPROVEMENT IN PLOWS.

Specification forming part of Letters Patent No. 191,267, dated May 29, 1877; application filed December 18, 1876.

*To all whom it may concern:*

Be it known that I, JOHN W. THOM, of Minneapolis, in the county of Ottawa and State of Kansas, have invented a new and useful Improvement in Plows, which improvement is fully set forth in the following specification, reference being had to the accompanying drawing.

Figure 1:
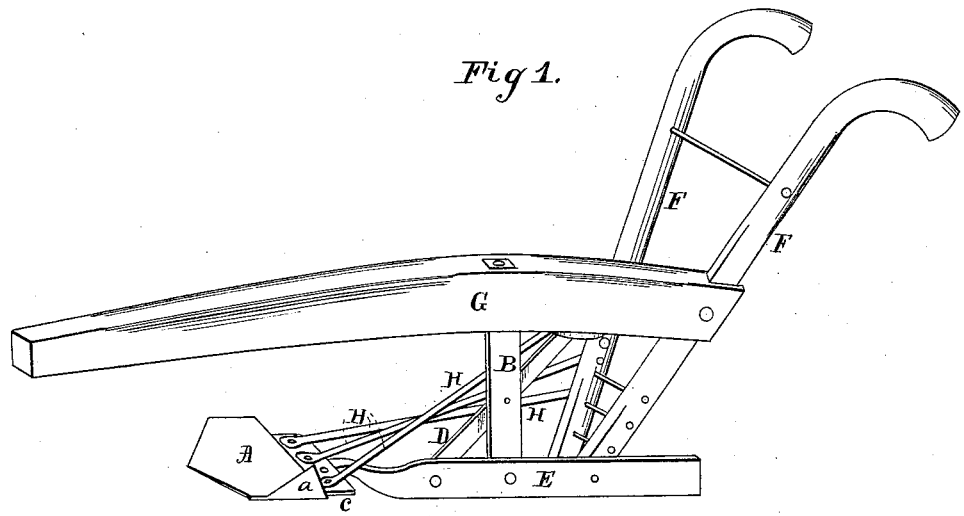

The object of my invention is to easily and rapidly cut and turn over the sod by cutting it all off before raising the sod to turn it over, as is shown in the perspective view, Figure 1, of the accompanying drawing.

Figure 2:
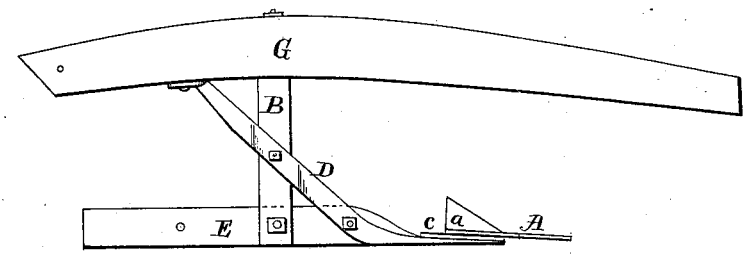
Figure 3:
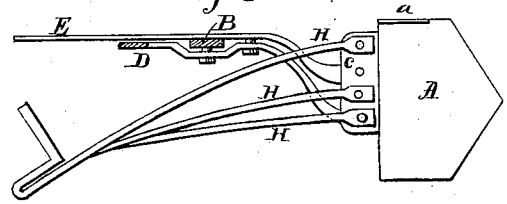

The plow is illustrated more in detail in the plan view, Fig. 3, and in the vertical section, Fig. 2.

The share A is of a diamond shape, the point being in the center and a cutter, $a$, on one side. The cutter is solid and part of the share, as shown in Fig. 1, the share being fastened on the plate $c$, and plate $c$ being fastened on the bar E and brace D with bolts. The brace D is fastened on the bar E and upright piece B with bolts, and the beam G is fastened on upright piece B and handle F.

The sod is raised by means of three rods, H, fastened to cross-plate $c$, together with bar E and brace D, rods H running back to handle F. The bar E and brace D support the share A, being fastened to it by bolts, as will be seen by the accompanying drawing.

I claim as my invention—

The combination, in a sod-plow, of the share A, having cutter $a$, the curved land-side bar E, the curved brace D, and plate $c$, all arranged and secured together substantially as described.

JOHN W. THOM.

Witnesses:
A. B. MURCH,
WM. WELLS.